July 3, 1962 G. C. BURD 3,042,319
COMBINED NOZZLE AND VALVE CONSTRUCTION
Filed Jan. 23, 1961
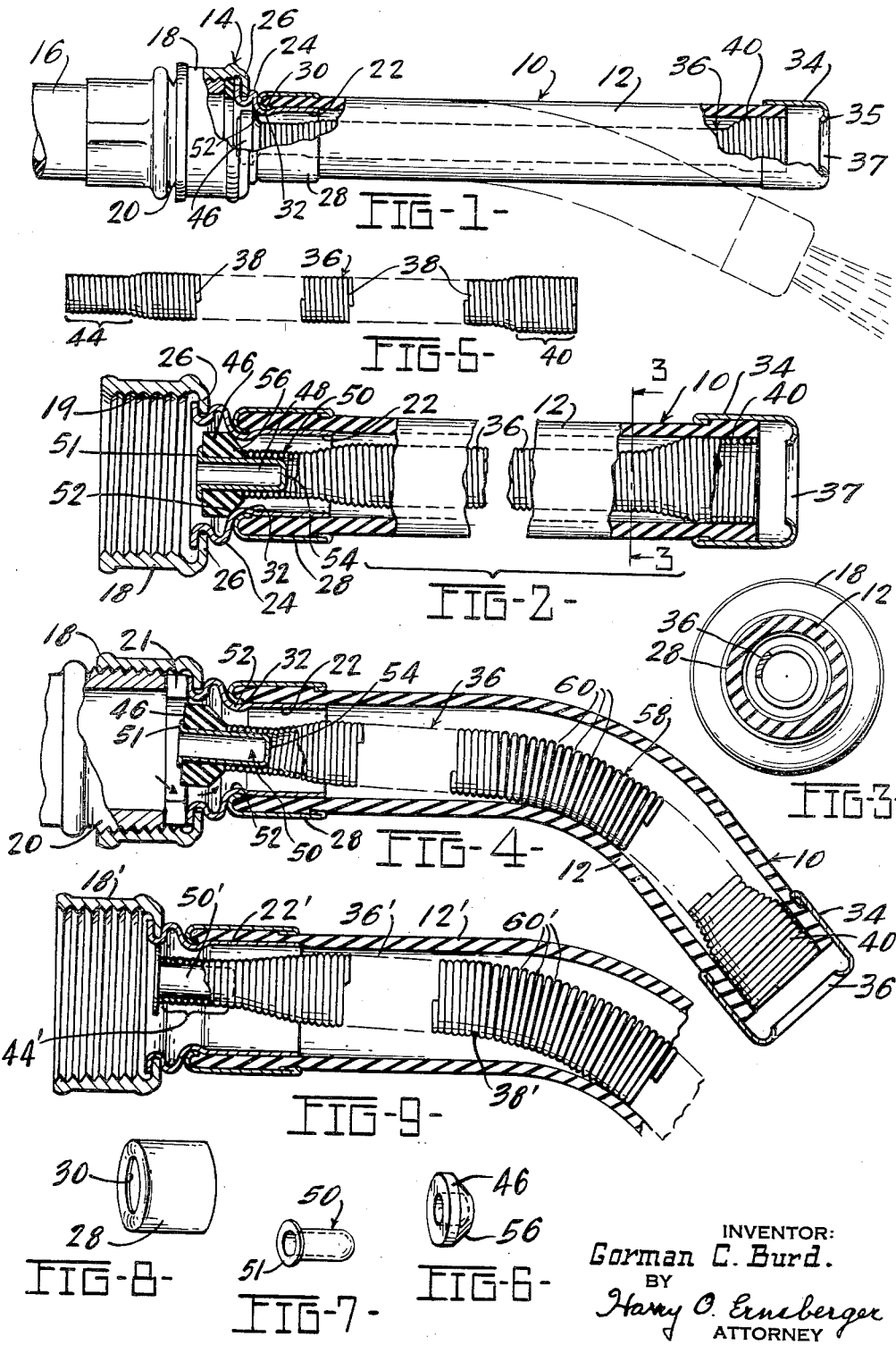
INVENTOR:
Gorman C. Burd.
BY
Harry O. Erneberger
ATTORNEY United States Patent Office 3,042,319
Patented July 3, 1962

3,042,319
COMBINED NOZZLE AND VALVE
CONSTRUCTION
Gorman C. Burd, 1531 S. Cove Blvd., Toledo, Ohio
Filed Jan. 23, 1961, Ser. No. 84,291
13 Claims. (Cl. 239—576)

This invention relates to a combined nozzle and valve construction and more especially to a nozzle and valve arrangement adaptable for use with hose or pipe and is especially suited for controlling delivery of fluid from a hose or pipe.

The invention embraces the provision of a combined flexible nozzle unit embodying valve means which is particularly adaptable for use with hose for conveying water or other fluids and provides a simple, yet effective, valve control for discharge of fluid from the nozzle.

Another object of the invention resides in the provision of a nozzle formed of yieldable material embodying a flexible element adapted, when flexed, to admit flow of fluid through the nozzle, the amount of flexing of the element determining the extent of open area for fluid flow.

Another object of the invention resides in a flexible nozzle construction having a tubular body of nonmetallic yieldable material embracing a coil spring-like element providing a valve means which, upon flexing, effects an opening or spacing of the convolutions to facilitate the delivery of fluid through the outlet of the nozzle construction.

Another object of the invention resides in a flexible nonmetallic nozzle unit embodying valve means associated with a distortable element which is actuated upon flexing of the nozzle to effect an opening of the valve means, the extent of opening of the valve being dependent upon the extent of distortion of the element.

Still another object of the invention is the provision of a nozzle unit employing a body of yieldable material associated with a valve means actuated by a flexure of the body wherein the nozzle body component is joined with a coupling particularly adapted for connection with conventional hose construction.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an elevational view illustrating one form of combined hose and valve unit of the invention with certain parts shown in section;

FIGURE 2 is an enlarged longitudinal sectional view of the nozzle and valve construction of FIGURE 1 with the valve means in closed position;

FIGURE 3 is a transverse sectional view taken substantially on the line 3—3 of FIGURE 2;

FIGURE 4 is a longitudinal sectional view of the nozzle unit and valve construction illustrating the nozzle body distorted and the valve means in open position;

FIGURE 5 is an elevation view of a flexible valve component;

FIGURE 6 is an isometric view of a valve disc;

FIGURE 7 is an isometric view of a closure for one end of the valve component illustrated in FIGURE 5;

FIGURE 8 is an isometric view of a ferrule for the flexible nozzle body, and

FIGURE 9 is a longitudinal sectional view of a form of flexible nozzle embodying the arrangement shown in FIGURE 5 forming a valve means.

While the combined nozzle and valve construction is illustrated as particularly usable with hose construction of conventional character for uses where it is particularly desirable to effect water or other fluid flow through the nozzle for short periods of time, it is to be understood that the nozzle and valve construction of the invention may be employed wherever it is desirable to initiate fluid flow from the nozzle simply by distorting the flexible nozzle body and thereby automatically actuating the fluid flow control valve.

Referring to the drawings in detail, and first with reference to the form of the invention shown in FIGURES 1 through 8, the nozzle construction 10 is inclusive of a tubular body 12 formed of reinforced rubber or rubber-like material and which is normally in a rectilinear position but which may be distorted by laterally applied pressure and, when such pressure is removed, is inherently adapted to return to its rectilinear position. The tubular nozzle body 12 is adapted to be connected with a fitting or coupling unit 14 which is adapted to be connected with a hose, pipe or duct 16 for conveying fluid.

The fitting 14 includes a coupling 18 which is internally threaded as at 19 and is adapted to be threaded upon a conventional male coupling member 20 secured to the end of a hose, pipe or duct 16 for conveyng water or other fluid under pressure, a gasket 21, shown in FIGURE 4, being disposed between the couplings 18 and 20. The coupling member 18 is connected with a nipple 22 which has a portion extending interiorly of the tubular body 12 and a circular region 24 of U-shaped cross-section into which projects an inwardly turned flange 26 formed on the coupling member 18.

A tubular ferrule 28 surrounds the body 12 and compresses a region of the body adjacent the portion of the nipple 22 extending into the body to form a secure fluid tight connection between the body and the nipple.

The ferrule 28 is formed with an inwardly extending flange portion 30 which engages in a circular recess 32 formed in the nipple 22 to resist displacement of the ferrule 28 or the body 12 under fluid pressure. The discharge end of the tubular body 12 is embraced by a ferrule 34 of the same character as the ferrule 28, the ferrule having an inwardly turned flange 35 defining a nozzle outlet or orifice 37 through which fluid is delivered from the nozzle construction.

A valve means is associated with the nozzle construction and is moved to a position upon distortion or bending of the flexible tubular body 12 to permit flow of fluid through the body for delivery through the orifice 37. Disposed lengthwise of and within the body 12 is a flexible member 36 which is formed of closely wound coils or convolutions 38 of metal forming a spring-like component, wherein the adjacent coils are in contact and, in effect, form a flexible tube. The coils of the spring at the region indicated at 40 are of a larger diameter than the coils at the central region of the tube-like coil spring 36.

The coils at the region 40 are of a diameter to be snugly fitted or pressed into the end region of the tubular body 12 to form a fluid tight juncture between the end region of the body 12 and the convolutions of the spring in the region indicated at 40. As shown in FIGURES 1, 2 and 5, the convolutions of the spring or component 36 are in closed or contacting relation when the component is in a normal rectilinear position. The convolutions at the opposite end region 44 of the spring 36 are of a lesser diameter than the convolutions at the central region as shown in FIGURE 5.

In the form of construction illustrated in FIGURES 1 through 4, a disc valve member 46 is associated with the valve spring 36. The valve disc 46 is provided with an opening to receive the cylindrical portion 48 of the cuplike member 50, illustrated in FIGURE 7, the cylindrical portion 48 being of a dimension to be snugly received in the interior of the convolutions of the spring at the region 44. Through this arrangement the valve disc 46 is supported by the valve spring 36 and is adapted to seat upon an inwardly extending circular ridge or bead 52 of the nipple 22 defining the recess 32 when the flexible body 12 is in a rectilinear position as shown in FIGURES 1 and 2.

The member 48 is provided with an imperforate end wall 54 to prevent flow of fluid except around the valve disc 46 when the latter is moved away from its seat 52 as shown in FIGURE 4. A circular flange 51 on the closure 50 secures the valve disc 46 on the cylindrical portion 48. The valve disc 46 is preferably formed with a frusto-conically shaped valve surface 56 for engagement with the valve seat provided by the inwardly extending circular ridge 52.

The length of the spring component 36 is such that when the component 36 and the tubular nozzle body 12 are in rectilinear position as shown in FIGURES 1 and 2, the valve surface 56 is seated against the inwardly extending bead or ridge 52 to prevent fluid flow past the valve disc 46.

When the nozzle body 12 is flexed toward the position illustrated in FIGURE 4, the flexure or bending of the nozzle body 12, in effect, shortens the distance between the nozzle discharge end of the body 12 and the valve seat 52 of the fitting. This flexure or distortion of the valve body also flexes the spring or flexible component 36. As the coils or convolutions of the spring are in contact at the inner radius of the bend and in full circular contact at the unflexed regions of the spring, the flexure causes longitudinal movement of the distal end of the spring equipped with the valve disc 46 relative to the body 12 whereby the valve disc 46 is moved away from the valve seat 52 as shown in FIGURE 4, permitting fluid under pressure in the hose or pipe 16 to flow past the valve disc into the generally annular region surrounding the spring or coiled member 36.

As the spring 36 is bent or flexed into the position shown in FIGURE 4, the regions of the convolutions 38 of the spring at the arcuate zone of flexure 58 are distorted or partially separated providing open areas 60 between adjacent convolutions of the spring 36. The fluid, in the generally annular space between the periphery of the spring 36 and the inner wall of the flexible body 12, flows through the open areas or interstices 60 into the hollow or tubular interior of the spring thence outwardly through the discharge orifice or opening 37 of the nozzle unit.

The flow of fluid continues from the nozzle during the period that the flexible body 12 and the spring 36 are in distorted or bent positions as shown in FIGURE 4. When it desired to stop the flow of fluid from the nozzle, the user removes lateral pressure from the body 12 whereby the body 12 and spring 36 are automatically reflexed or returned to rectilinear positions as indicated in FIGURES 1 and 2 by inherent stresses in the body and spring. As the spring approaches its rectilinear position, the tapered openings 60 between adjacent convolutions are gradually closed and the valve disc 46 is moved lengthwise relative to the body into valve-closing position with the valve surface 56 contacting the circular ridge 52, thus interrupting or stopping fluid flow into the nozzle body 12.

The flexible spring with normally closed convolutions, some of which are partially spaced or separated upon lateral flexure, provides in itself, a valve means or obturator usable for controlling fluid flow through the nozzle unit. A construction of this character is illustrated in FIGURE 9. In this form of the invention, the flexible or yieldable tubular nozzle body 12', the coupling 18', the nipple 22' and the ferrules are the same as the corresponding components embodied in the construction shown in FIGURES 1 through 4.

The spring component 36' may be of the same size and configuration as the component 36 shown in FIGURE 5. As shown in FIGURE 9, the cup-shaped member 50' is fitted into the region 44' of the spring 36' wherein the convolutions are of reduced diameter. The cup-shaped member 50' prevents flow of fluid into the interior of the spring at the region of the coupling.

With the tubular body 12' and the spring component 36' are in rectilinear positions, that is, in unflexed positions, the convolutions 38' of the spring are in closed or contacting relation throughout the length of the spring so that fluid, contained within the annular space defined between the inner wall of the body 12' and the periphery of the convolutions of the spring 36', is prevented from flowing into the hollow interior of the spring and hence no fluid is discharged through the nozzle orifice. Thus the convolutions of the spring 36', when in closed contacting position, provide a valve means or obturator to prevent fluid flow out of the nozzle.

When the flexible body 12' is bent or flexed as shown in FIGURE 9, the central region of the spring 36' is also flexed, partially separating the convolutions 38' toward their outer regions providing the tapered or wedge shaped openings 60'. In such flexed position, fluid under pressure in the body 12' flows through the tapered openings 60' into the hollow interior of the spring and is discharged through the nozzle at the end of the body 12', the nozzle delivery orifice being of the same construction shown in FIGURES 1, 2 and 4.

Thus it will be apparent that the convolutions of the spring in both forms of the construction function as valve means or obturator to permit or obstruct fluid flow through the nozzle. The use of the valve disc 46 provides a positive closing valve as the valve surface 56 normally seats against the ridge or bead 52.

In the construction employing the spring by itself as the valve means, slight imperfections or in imperfect contact of adjacent convolutions may result in a slight leakage of fluid into the interior of the spring.

If desired, the metal wire, from which the spring is formed, may be first coated with a thin film or coating of latex, plastic or other nonmetallic material so that the coating on the convolutions when the convolutions are in closed positions, provides an effective seal between adjacent convolutions to avoid liability of leakage. When convolutions bearing a coating of latex or plastic material are flexed to valve opening positions, the tapered open areas are established in the same manner as indicated in FIGURE 9 to facilitate fluid flow to the interior of the spring for delivery through the nozzle outlet.

It will be apparent that the forms of construction shown and described herein provide a simple, yet effective, valve and nozzle unit wherein operation of the valve means is had simply by the user exerting finger pressure laterally upon the outer end region of the tubular body 12 to flex the same and the valve spring to secure fluid discharge from the nozzle end. Fluid flow is automatically stopped when the flexing pressure is removed from the body 12 and the body and spring 36 permitted to return to their normal rectilinear positions.

It is apparent that, within the scope of the invention, modifications and different arrangements may be made other than as herein disclosed, and the present disclosure is illustrative merely, the invention comprehending all variations thereof.

I claim:

1. A nozzle construction including, in combination, a tubular body formed of nonmetallic yieldable material, a coupling construction attached to one end of said body, an elongated flexible tubular element formed of a plurality of normally close convolutions of linear material disposed within the body, one end region of the flexible element being in fluid tight relation with the outlet end of the body, closure means for the opposite end region of the flexible tubular element, said tubular body being adapted to be flexed whereby to flex said tubular element and separate convolutions thereof to accommodate flow of fluid through the coupling construction to the interior of the flexible tubular element for discharge through the outlet end of the tubular body.

2. A nozzle construction including, in combination, a tubular nozzle body formed of nonmetallic yieldable material, a coupling construction attached to one end of said body, an elongated flexible tubular element formed of close convolutions of linear material disposed within the body, the convolutions at one end region of the flexible element being in fluid tight relation with the outlet end of the body, closure means for the opposite end region of the flexible tubular element, said tubular body being adapted to be flexed whereby to flex the tubular flexible element providing an open region to accommodate flow of fluid through the coupling construction to the interior of the flexible tubular element for discharge through the outlet end of the tubular body.

3. A nozzle construction including, in combination, a tubular body formed of nonmetallic yieldable material, a coupling construction attached to one end of said body, a flexible tubular element having a portion formed of close convolutions of flexible linear material disposed within the body, one end region of the flexible element being in fluid tight relation with the outlet end of the body, closure means for the opposite end region of the flexible tubular element, said tubular body being adapted to be flexed whereby to flex convolutions of the flexible element to accommodate flow of fluid through the coupling construction to the interior of the flexible tubular element for discharge through the outlet end of the tubular body.

4. A nozzle construction including, in combination, a tubular body formed of nonmetallic yieldable material, a coupling attached to one end of said body, a flexible tubular element formed of close convolutions of linear material disposed within the body, one end region of the flexible element being of increased diameter in fluid tight engagement with the outlet end of the body, closure means for the opposite end region of the flexible tubular element, said tubular body being adapted to be flexed whereby to flex convolutions of the flexible element providing open regions between adjacent flexed convolutions to accommodate flow of fluid to the interior of the flexible tubular element for discharge through the outlet end of the tubular body.

5. A nozzle construction including, in combination, a tubular body formed of flexible material, a coupling construction attached to one end of the body, a flexible tubular element formed of a plurality of close convolutions of linear material having one end in fluid tight relation with the outlet end of the tubular body, a disc member mounted by the other end of the flexible element, means carried by said coupling construction forming a seat for said disc member, said disc member being normally in contact with the seat, said tubular body being adapted to be flexed whereby the flexible element is actuated to move the disc member relative to its seat.

6. A nozzle construction including, in combination, a tubular body formed of flexible material, a coupling construction attached to one end of the body, an elongated flexible tubular element formed of a plurality of convolutions of wire having one end in fluid tight relation with the outlet end of the tubular body, a valve member mounted by the other end of the flexible element, means associated with the coupling construction forming a seat for said valve member, said valve member being normally in contact with the seat when the tubular body is in a rectilinear position, said tubular body being adapted to be flexed whereby the flexible element is actuated to move the valve member relative to its seat.

7. A nozzle construction including, in combination, a tubular body formed of flexible material, a coupling construction attached to one end of the body, an elongated flexible tubular element formed of a plurality of close convolutions of wire having one end in fluid tight relation with the outlet end of the tubular body, said flexible element having a portion of lesser diameter than the interior diameter of the tubular body, a valve member carried by the other end of the flexible element, means carried by said coupling construction forming a seat for said valve member, said valve member being normally in contact with the seat when the tubular body is in a rectilinear position, said tubular body being adapted to be flexed whereby the flexible element is actuated to move the valve member relative to its seat.

8. A nozzle construction including, in combination, a tubular body formed of nonmetallic yieldable material, a coupling construction attached to one end of said body, a flexible tubular element formed of close convolutions of metal wire disposed within the body, one end region of the flexible element being in fluid tight relation with the outlet end of the body, a valve member carried by the opposite end of the flexible element, said coupling construction having an inwardly extending circular ridge forming a seat for the valve member, said valve member being normally in contact with the seat when the tubular body is in rectilinear position, said tubular body being adapted to be flexed laterally whereby to flex the flexible element and disengage the valve member from its seat.

9. A nozzle construction including, in combination, a tubular body formed of nonmetallic yieldable material, a coupling construction attached to one end of said body, a flexible tubular element formed of close convolutions of metal wire disposed within the body, one end region of the flexible element being in fluid tight relation with the outlet end of the body, a cup-shaped member having a portion extending into the opposite end of the flexible element, a valve disc carried by the cup-member, said coupling construction having an inwardly extending circular ridge forming a seat for said disc, said disc being normally in contact with the seat when the tubular body is in rectilinear position, said tubular body being adapted to be flexed laterally whereby to flex the flexible element and disengage the valve disc from its seat.

10. A nozzle construction including, in combination, a tubular body formed of nonmetallic yieldable material, a coupling construction attached to one end of said body, an elongated flexible tubular element formed of close convolutions disposed within the body, one end region of the flexible element being in fluid tight relation with the outlet end of the body, a member having a cylindrical portion and a flange portion, a valve disc having an opening therein, the cylindrical portion of said member extending through the opening in the disc and into the other end of the flexible element and forming a closure for said end, said coupling construction being provided with a circular ridge forming a seat for said disc, said disc being normally in contact with the seat when the tubular body is in a substantially rectilinear position, said tubular body being adapted to be flexed laterally whereby to flex said element and move the disc away from its seat.

11. A nozzle construction including, in combination, a tubular body member formed of nonmetallic yieldable material, a fitting attached to one end of the body member adapted to be connected with a hose through which fluid is conveyed, a tubular element formed of a plurality of convolutions of flexible material with the convolutions normally in close relation, a region of the flexible element being of lesser diameter than the internal diameter of the tubular body, one end region of the element being in fluid tight relation with the outlet end of the tubular body, a ferrule embracing the outlet end of the tubular body, the other end of the flexible element terminating adjacent the fitting, and a closure for the end of the element adjacent the fitting, said element being arranged to be flexed with said tubular body whereby convolutions of the flexible element are opened to admit flow of fluid through the spaces between adjacent convolutions for discharge through the outlet end of the flexible element.

12. A nozzle construction including, in combination, a tubular body member formed of nonmetallic yieldable material, a fitting attached to one end of the body member adapted to be connected with a hose through which fluid is conveyed, an elongated element formed of a plurality of convolutions of metal with the convolutions normally in close relation, a central region of the flexible element being of lesser diameter than the internal diameter of the tubular body, one end region of the element being in fluid tight relation with the outlet end of the tubular body, a ferrule embracing the outlet end of the tubular body, the other end of the flexible element terminating adjacent the fitting, and a closure for the end of the element adjacent the fitting, said element being arranged to be flexed with said tubular body whereby convolutions of the flexible element are opened to admit flow of fluid through the spaces between adjacent convolutions for discharge through the outlet end of the flexible element.

13. A nozzle construction including, in combination, a tubular body member formed of nonmetallic yieldable material, a fitting attached to one end of the body member adapted to be connected with a hose through which fluid is conveyed, an elongated element formed of a plurality of convolutions of metal with the convolutions normally in close relation, a central region of the flexible element being of lesser diameter than the internal diameter of the tubular body, one end region of the element being in fluid tight relation with the outlet end of the tubular body, the other end of the flexible element terminating adjacent the fitting, a valve seat associated with the fitting, a valve member carried by said element adjacent the fitting and normally engaging said seat, said element being arranged to be flexed with said tubular body whereby said valve member is disengaged from the seat and convolutions of the flexible element opened to admit flow of fluid through the spaces between adjacent convolutions for discharge through the outlet end of the flexible element.

References Cited in the file of this patent

UNITED STATES PATENTS

| | | |
|---|---|---|
| 2,785,016 | Vollertzen et al. | Mar. 12, 1957 |
| 2,799,471 | Maroney | July 16, 1957 |

FOREIGN PATENTS

| | | |
|---|---|---|
| 602,142 | Germany | Sept. 1, 1934 |